United States Patent
Xiao et al.

(10) Patent No.: US 9,843,963 B2
(45) Date of Patent: Dec. 12, 2017

(54) LOAD BALANCE METHOD AND RELEVANT APPARATUSES

(71) Applicant: Huawei Technologies Co., Ltd., Shenzhen, Guangdong (CN)

(72) Inventors: Dengkun Xiao, Beijing (CN); Tong Wu, Shenzhen (CN); Jing Han, Beijing (CN); Yuan He, Shenzhen (CN); Jie Cui, Beijing (CN); Anjian Li, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 631 days.

(21) Appl. No.: 14/336,684

(22) Filed: Jul. 21, 2014

(65) Prior Publication Data

US 2014/0349704 A1  Nov. 27, 2014

Related U.S. Application Data

(63) Continuation of application No. PCT/CN2013/070777, filed on Jan. 21, 2013.

(30) Foreign Application Priority Data

Jan. 20, 2012  (CN) .......................... 2012 1 0019107

(51) Int. Cl.
*H04W 72/00* (2009.01)
*H04W 28/08* (2009.01)
(Continued)

(52) U.S. Cl.
CPC ........... *H04W 28/08* (2013.01); *H04W 16/08* (2013.01); *H04W 16/14* (2013.01)

(58) Field of Classification Search
USPC ....................................................... 455/525
See application file for complete search history.

(56) References Cited

U.S. PATENT DOCUMENTS

| | | | |
|---|---|---|---|
| 2009/0325624 A1* | 12/2009 | Centonza | H04W 16/08 455/522 |
| 2011/0171952 A1* | 7/2011 | Niu | H04L 43/0882 455/422.1 |
| 2013/0286841 A1 | 10/2013 | Gao et al. | |

FOREIGN PATENT DOCUMENTS

| | | |
|---|---|---|
| CN | 1859790 A | 11/2006 |
| CN | 101031132 A | 9/2007 |
| (Continued) | | |

OTHER PUBLICATIONS

Tragos et al, "Access selection and mobility management in a beyond 3G RAN: The WINNER approach," Telecommunication Systems, vol. 42, pp. 165-177, New York, New York (Oct. 16, 2009).

(Continued)

*Primary Examiner* — Ankur Jain
(74) *Attorney, Agent, or Firm* — Leydig, Voit & Mayer, Ltd.

(57) ABSTRACT

Embodiments of the present invention disclose a load balance method and relevant apparatuses to implement load balance between base stations in a communications network that includes an LTE base station. The method in an embodiment of the present invention includes: obtaining, by a radio resource management RRM server, load information reported by base stations, where the base stations include a Long Term Evolution LTE base station; determining an overloaded base station in the base stations; determining a target base station according to the load information, where the target base station is a base station to share a load of the overloaded base station; and instructing the overloaded base station and the target base station to perform load balance.

14 Claims, 8 Drawing Sheets

(51) Int. Cl.
*H04W 16/08* (2009.01)
*H04W 16/14* (2009.01)

(56) References Cited

FOREIGN PATENT DOCUMENTS

| | | |
|---|---|---|
| CN | 101541041 A | 9/2009 |
| EP | 1420604 A1 | 5/2004 |
| EP | 1657862 A1 | 5/2006 |
| EP | 2416605 A1 | 2/2012 |
| WO | WO 2008090049 A1 | 7/2008 |

OTHER PUBLICATIONS

"Functions related to Inter-cell RRM," 3GPP TSG RAN WG3 Meeting #51, Denver, Colorado, USA, R3-060116, $3^{rd}$ Generation Partnership Project, Valbonne, France (Feb. 13-17, 2006).

"RRM Architecture," 3GPP TSG RAN WG3 Meeting #51, Denver, USA, R3-060206, $3^{rd}$ Generation Partnership Project, Valbonne, France (Feb. 13-17, 2006).

"On Traffic Load Reporting in LTE," TSG-RAN WG3 #51 bis, Sophia Antipolis, France, R3-060426, $3^{rd}$ Generation Partnership Project, Valbonne, France (Apr. 3-5, 2006).

Mino et al., "IST-4-027756 WINNER II, D4.8.2, v1.0, Cooperation schemes validation," pp. 1-113, Information Society Technologies, Brussels, Belgium (Jun. 30, 2007).

\* cited by examiner

LOAD BALANCE METHOD AND RELEVANT APPARATUSES

CROSS-REFERENCE TO RELATED APPLICATION

This application is a continuation of International Patent Application No. PCT/CN2013/070777, filed on Jan. 21, 2013, which claims priority to Chinese Patent Application No. 201210019107.1, filed on Jan. 20, 2012, both of which are hereby incorporated by reference in their entireties.

TECHNICAL FIELD

The present invention relates to the communications field, and in particular, to a load balance method and relevant apparatuses.

BACKGROUND

Due to rapid development of mobile communications, operators need to provide faster and richer services to users. In network evolution and upgrading, it is foreseeable that 2G (2nd Generation) networks (for example, Global System for Mobile Communications (GSM), and Enhanced Data Rate for GSM Evolution systems (EDGE)), 3G (3rd Generation) networks (for example, Wideband Code Division Multiple Access (WCDMA) systems, and Time Division Synchronous Code Division Multiple Access (TD-SCDMA) systems, and Long Term Evolution (LTE) systems will coexist for a considerably long time to provide high-quality communications services to users.

Because different networks are originally designed for different purposes and occupy different frequency and spectrum resources, and services over the networks are always changing dynamically, in an existing technical solution, imbalance of radio resources and network loads always occur in a multimode network. For example, in hotspot coverage of an LTE system, cell 1 may be fully loaded, but cell 2 or cell 3 near cell 1 has many idle resources at this time. However, a distributed resource management and resource allocation mode is applied in all current LTE systems, where interaction and resource balancing capabilities between evolved base stations (eNB, Evolved Node B) are rather limited. Consequently, an optimal load balance policy cannot be implemented between cell 2 or cell 3 and cell 1, causing call drops to users in cell 1 and degradation of quality of service (QoS) for users, while the idle resources in cell 2 and cell 3 are not utilized reasonably, and the network throughput performance is also deteriorated.

SUMMARY

Embodiments of the present invention provide a load balance method and relevant apparatuses to implement load balance between base stations in a communications network that includes an LTE base station.

A load balance method provided in the present invention includes: obtaining, by a radio resource management RRM server, load information reported by base stations, where the base stations include a Long Term Evolution LTE base station; determining an overloaded base station in the base stations; determining a target base station according to the load information, where the target base station is a base station to share a load of the overloaded base station; and instructing the overloaded base station and the target base station to perform load balance.

A load balance method provided in the present invention includes: reporting, by a base station, load information of the base station to an RRM server, so that the RRM server determines, according to the load information, a target base station to perform load balance, where the target base station is a base station to share a load of an overloaded base station.

A radio resource management server provided in the present invention includes: an obtaining unit, configured to obtain load information reported by base stations, where the base stations include a Long Term Evolution LTE base station; a first determining unit, configured to determine an overloaded base station in the base stations; a second determining unit, configured to determine a target base station according to the load information, where the target base station is a base station to share a load of the overloaded base station; and a load balance unit, configured to instruct the overloaded base station and the target base station to perform load balance.

A base station provided in the present invention includes: a reporting unit, configured to report load information of the base station to an RRM server, so that the RRM server determines, according to the load information, a target base station to perform load balance, where the target base station is a base station to share a load of an overloaded base station.

As can be seen from the foregoing technical solutions, the embodiments of the present invention have the following advantages: An RRM server in the embodiments of the present invention can obtain load information reported by base stations, and, after determining an overloaded base station in the base stations, determine, according to the load information, a target base station to share a load of the overloaded base station, so that the RRM server can instruct the overloaded base station and the target base station to perform load balance, thereby optimizing resource configuration in a communications network.

DESCRIPTION OF EMBODIMENTS

Embodiments of the present invention provide a load balance method and relevant apparatuses to implement load balance between base stations in a communications network that includes an LTE base station.

Figure 1:
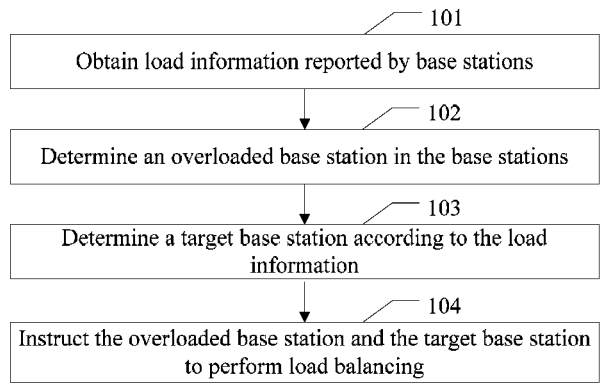
FIG. 1 is a schematic flowchart of a load balance method according to an embodiment of the present invention.

As shown in FIG. 1, a load balance method in an embodiment of the present invention includes the following:

101. Obtain Load Information Reported by Base Stations.

A radio resource management (RRM, Radio Resource Management) server obtains load information reported by base stations, where the base stations include at least one LTE base station. Specifically, the base stations may all be LTE base stations, or may include base stations of other modes, which is not limited herein.

The load information is information that reflects radio resource occupation states of the base stations. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof; load information of a Universal Mobile Telecommunications System (UMTS) base station may be any one of maximum transmit power, maximum received power, and a maximum number of connected users, or a combination of at least two thereof; load information of a GSM base station may be any one of a downlink transmit power class, a maximum number of connected users, spectrum occupancy rate, and idle resources, or a combination of at least two thereof.

Optionally, the base stations may proactively report the load information periodically, or the RRM server may instruct, through an indication message, the base stations to report the load information. The specific reporting manner may depend on actual conditions, and is not limited herein.

In practical applications, when a network architecture is deployed, an RRM server may be deployed in a certain range to correspondingly optimize and allocate radio resources of multiple modes of radio systems in the range, where the multiple modes of radio systems include an LTE system. The RRM server may establish communication connections to base stations in the multiple modes of radio systems through an S.x interface, where the S.x interface is an S.x type communication interface for exchange of control signaling between devices on two sides of the interface, for example, an S1 interface or an S2 interface; and physical devices with an S.x interface are connected through fibers.

102. Determine an Overloaded Base Station in the Base Stations.

The RRM server determines an overloaded base station in the base stations, where the overloaded base station is a base station in an overloaded state.

Optionally, the RRM server may detect an overloaded base station in the base stations (for example, according to the load information), or an overloaded base station reports itself proactively. The specific manner of determining an overloaded base station will be detailed in subsequent embodiments, and is not limited herein.

103. Determine a Target Base Station According to the Load Information.

The RRM server determines a target base station according to the load information, where the target base station is a base station to share a load of the overloaded base station.

The target base station needs to share the load of the overloaded base station, and therefore, the target base station is a base station with idle spectrum resources that are enough to share the traffic overload of the overloaded base station. Specifically, the RRM server may know load states of the base stations according to the load information reported by the base stations, and then select a proper base station among them as a target base station to share the load of the overloaded base station. The specific method of selecting a target base station will be detailed in subsequent embodiments, and is not limited herein.

104. Instruct the Overloaded Base Station and the Target Base Station to Perform Load Balance.

After determining the overloaded base station and the corresponding target base station, the RRM server instructs the overloaded base station and the target base station to perform a load balance operation. Specifically, the load balance operation may include user handover and spectrum sharing, which will be detailed in subsequent embodiments and is not limited herein.

An RRM server in the embodiment of the present invention can obtain load information reported by base stations, and, after determining an overloaded base station in the base stations, determine, according to the load information, a target base station to share a load of the overloaded base station, so that the RRM server can instruct the overloaded base station and the target base station to perform load balance, thereby optimizing resource allocation in a communications network.

Figure 2:
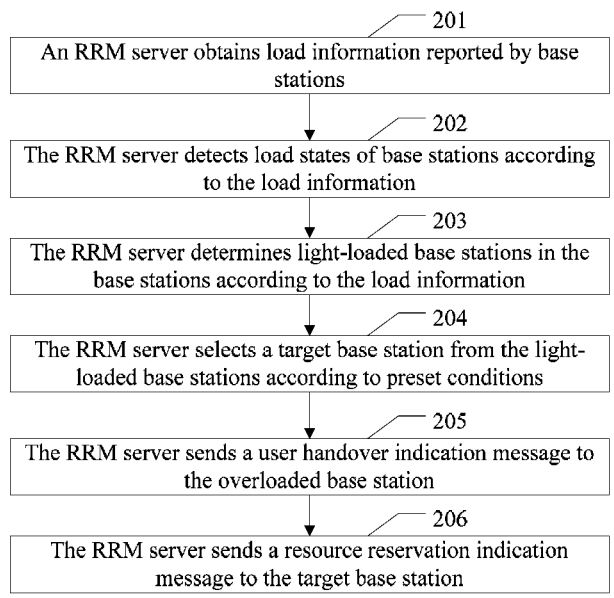
FIG. 2 is another schematic flowchart of a load balance method according to an embodiment of the present invention.

The overloaded base station may be determined by the RRM server according to the load information, or the overloaded base station may report itself proactively. The following description assumes that the RRM server determines an overloaded base station according to the load information. As shown in FIG. 2, a load balance method in another embodiment of the present invention includes the following:

201. An RRM Server Obtains Load Information Reported by Base Stations.

An RRM server obtains load information reported by base stations, where the base stations include at least one LTE base station, and may further include a UMTS base station and a GSM base station.

The load information is information that reflects radio resource occupation states of the base stations. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof load information of a Universal Mobile Telecommunications System (UMTS) base station may be any one of maximum transmit power, maximum received power, and a maximum number of connected users, or a combination of at least two thereof; load information of a GSM base station may be any one of a downlink transmit power class, a maximum number of connected users, spectrum occupancy rate, and idle resources, or a combination of at least two thereof.

202. The RRM Server Detects Load States of the Base Stations According to the Load Information.

The RRM server detects load states of the base stations according to the load information; and, if the load information of any one of the base stations meets an overload condition, determines that the base station is an overloaded base station.

Specifically, the RRM server may detect the load states of the base stations periodically. The RRM server may preset different overload conditions for base stations of different modes. For example, for an LTE base station, a preset spectrum occupancy rate threshold is $TH_1$, a preset threshold of the number of users in a cell is $TH_2$, and a preset service-based network capacity threshold is $TH_3$. It is assumed that spectrum occupancy rate, the number of users in a cell, and service-based network capacity that are reported by an LTE base station k are $LI_{k,1}$, $LI_{k,2}$, and $LI_{k,3}$. If $LI_{k,1} > TH_1$, or $LI_{k,2} > TH_2$, or indicates that the LTE base station k is overloaded.

203. The RRM Server Determines Light-Loaded Base Stations in the Base Stations According to the Load Information.

After determining existence of an overloaded base station in the base stations, the RRM server determines light-loaded base stations in the base stations according to the load information, where the light-loaded base stations are base stations that meet a light load condition.

Specifically, the RRM server may preset different light load conditions for base stations of different modes, and, when detecting any one base station meeting a light load condition, determine that the base station is a light-loaded base station. For example, for an LTE base station, an idle resource rate threshold preset by the RRM server is $TH_4$, and a preset threshold of network capacity corresponding to reserved resources is $TH_5$. It is assumed that an idle resource rate and the number of reserved resources that are reported by an LTE base station j are $LI_{j,4}$ and $LI_{j,5}$ respectively. If $LI_{j,4} > TH_4$, or $LI_{j,5} > TH_5$, it indicates that the cell j is a light-loaded base station.

204. The RRM Server Selects a Target Base Station from the Light-Loaded Base Stations According to a Preset Condition.

After determining the light-loaded base stations, the RRM server selects a target base station from the light-loaded base stations according to a preset condition.

Optionally, in practical applications, if there is only one light-loaded base station, the light-loaded base station is determined as the target base station; and if there are multiple light-loaded base stations, one of the multiple light-loaded base stations is selected as the target base station according to a preset parameter in the preset condition. The preset parameter includes any one of a base station mode, a distance from the overloaded base station, and a base station load state, or a combination of at least two thereof.

Specifically, the selecting one of the multiple light-loaded base stations as the target base station according to a preset parameter in the preset condition may be as follows. First, (corresponding to the base station mode), a light-loaded base station in the same mode as the overloaded base station in the light-loaded base stations is selected preferentially; and if there is only one light-loaded base station in the same mode as the overloaded base station, this base station is determined as the target base station; otherwise, further judgment needs to be made. Secondly, (corresponding to the distance from the overloaded base station), a light-loaded base station closest to the overloaded base station is selected, where, if there are multiple light-loaded base stations in the same mode as the overloaded base station, a light-loaded base station closest to the overloaded base station is selected from the multiple light-loaded base stations in the same mode; if there is no light-loaded base station in the same mode as the overloaded base station, a light-loaded base station closest to the overloaded base station is selected from all light-loaded base stations; and if there is only one light-loaded base station closest to the overloaded base station among the multiple light-loaded base stations in the same mode or among all the light-loaded base stations, this base station is determined as the target base station; otherwise, further judgment needs to be made. Thirdly, (corresponding to the base station load state), a light-loaded base station with the lightest load is selected as the target base station from multiple light-loaded base stations closest to the overloaded base station.

Optionally, one of multiple light-loaded base stations may be selected as a target base station according to a preset parameter in the preset condition by using a weighted calculation method, which will be detailed in subsequent embodiments and is not limited herein.

205. The RRM Server Sends a User Handover Indication Message to the Overloaded Base Station.

The RRM server sends a user handover indication message to the overloaded base station, instructing the overloaded base station to hand over users to the target base station, where the user handover indication message carries identifier or address information of the target base station.

Specifically, after receiving the user handover indication message, the overloaded base station uses an X2 interface (the X2 interface is an interface between one eNB and another eNB), or an S1 interface (S1 is an interface between an eNB and a mobility management entity) to send a handover request (HANDOVER REQUEST) message to the target cell; and after receiving the HANDOVER REQUEST message from the overloaded cell, the target cell returns a handover request acknowledge (HANDOVER REQUEST ACKNOWLEDGE) message to the overloaded cell to hand over the user.

In practical applications, if the mode of the target base station is different from the mode of the overloaded base station, when performing user handover, the overloaded base station should select users (terminals) that support the mode of the target base station for user handover.

User handover is a method of load balance between the overloaded base station and the target base station. Alternatively, the load balance between the overloaded base station and the target base station may be implemented through spectrum sharing, which will be detailed in subsequent embodiments and is not limited herein.

206. The RRM Server Sends a Resource Reservation Indication Message to the Target Base Station.

Optionally, to ensure that the overloaded base station completes user handover successfully, the RRM server may send a resource reservation indication message to the target base station, so that the target base station performs a corresponding spectrum resource reservation operation and reserves a specific spectrum space to receive users handed over from the overloaded base station.

Specifically, if the overloaded base station hands over an edge user (the edge user is a user far away from the overloaded base station, with a weak signal strength) to the target base station, the edge user of the overloaded base station may share the same spectrum resource with an edge user of the target base station, and the user handover may be unsuccessful. Therefore, the RRM server may obtain resource information (including resources used by the overloaded base station, transmit power, received power, received interference, path loss, and so on) of edge users of the overloaded base station. When the resource reservation indication message is sent to the target base station, the resource reservation indication message carries the resource information, so that the target base station reserves a corresponding spectrum resource according to the resource information (if a spectrum resource used by an edge user of the overloaded base station conflicts with a spectrum resource used by an edge user of the target base station, after receiving the resource reservation indication message, the target base station may schedule spectrum resources for local edge users of the target base station to improve the success ratio of user handover).

Optionally, the RRM server may obtain the resource information of edge users of the overloaded base station by using various methods, for example, using a separate indication message to instruct the overloaded base station to feed back the resource information, or using a load balance request message sent by the overloaded base station proactively to carry the resource information, which is not limited herein.

Figure 3:
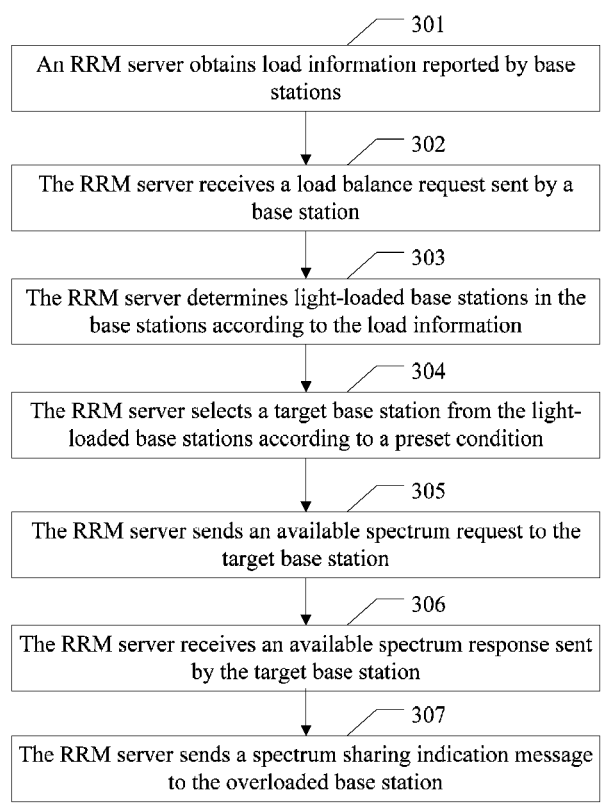
FIG. 3 is another schematic flowchart of a load balance method according to an embodiment of the present invention.

The following description assumes that the overloaded base station reports an overloaded state proactively. As shown in FIG. 3, a load balance method in another embodiment of the present invention includes the following:

301. An RRM Server Obtains Load Information Reported by Base Stations.

An RRM server obtains load information reported by base stations, where the base stations include at least one LTE base station, and may further include a UMTS base station and a GSM base station.

The load information is information that reflects radio resource occupation states of the base stations. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof load information of a Universal Mobile Telecommunications System (UMTS) base station may be any one of maximum transmit power, maximum received power, and a maximum number of connected users, or a combination of at least two thereof; load information of a GSM base station may be any one of a downlink transmit power class, a maximum number of connected users, spectrum occupancy rate, and idle resources, or a combination of at least two thereof.

302. The RRM Server Receives a Load Balance Request Sent by a Base Station.

The RRM server receives a load balance request sent by any one of the base stations, and determines that the base station sending the load balance request is an overloaded base station.

In practical applications, if overloaded, a base station may send a load balance request to the RRM server proactively, requesting the RRM server to perform load balance for the base station.

303. The RRM Server Determines Light-Loaded Base Stations in the Base Stations According to the Load Information.

After receiving the load balance request sent by the base station, the RRM server determines that the base station is an overloaded base station, and starts to perform a load balance operation for the overloaded base station.

The RRM server determines light-loaded base stations in the base stations according to the load information, where the light-loaded base stations are base stations that meet a light load condition.

Specifically, the RRM server may preset different light load conditions for base stations of different modes, and, when detecting any one base station meeting a light load condition, determine that the base station is a light-loaded base station. For example, for an LTE base station, an idle resource rate threshold preset by the RRM server is $TH_4$, and a preset threshold of network capacity corresponding to reserved resources is $TH_5$. It is assumed that an idle resource rate and the number of reserved resources that are reported by an LTE base station j are $LI_{j,4}$ and $LI_{j,5}$ respectively. If $LI_{j,4}>TH_4$, or $LI_{j,5}>TH_5$, it indicates that the cell j is a light-loaded base station.

304. The RRM Server Selects a Target Base Station from the Light-Loaded Base Stations According to a Preset Condition.

After determining the light-loaded base stations, the RRM server selects a target base station from the light-loaded base stations according to a preset condition.

Optionally, in practical applications, if there is only one light-loaded base station, the light-loaded base station is determined as the target base station; and if there are multiple light-loaded base stations, one of the multiple light-loaded base stations is selected as the target base station according to a preset parameter in the preset condition.

The preset parameter includes any one of a base station mode, a distance from the overloaded base station, and a base station load state, or a combination of at least two thereof.

Specifically, the selecting one of the multiple light-loaded base stations as the target base station according to a preset parameter in the preset condition may be: calculating a migration matching degree between each light-loaded base station and the overloaded base station according to the base station mode, the distance from the overloaded base station, the base station load state, and corresponding preset weights, where the migration matching degree is a degree suitable for the overloaded base station to perform load balance. For example, a weight corresponding to a light-loaded base station in the same mode as the overloaded base station is 8 and otherwise 0. It is assumed that the light-loaded base station is in the same mode as the overloaded base station. A weight corresponding to 1-kilometer distance from the overloaded base station is 5, where the distance is in inverse proportion to the weight value. If a distance between the light-loaded base station and the overloaded base station is 5 kilometers, a weight of the distance from the overloaded base station corresponding to the light-loaded base station is 5 divided by 5. It is assumed that a weight corresponding to one unit of idle resource of the light-loaded base station is 3, where the number of idle resources is in proportion to the weight. If the light-loaded base station has 2 units of idle resources, a weight of a load state corresponding to the light-loaded base station is 2 times 3. The calculated weights of various parameters are added up to obtain that a migration matching degree between the light-loaded base station and the overloaded base station is 15.

After the migration matching degree corresponding to each base station is obtained, a light-loaded base station with the highest migration matching degree is selected as the target base station.

In the embodiment of the present invention, the target base station may also be selected by using the judgment method in step 204. The specific method of selecting the target base station may depend on actual conditions, and is not limited herein.

The foregoing has described an application scenario of the embodiments of the present invention through some examples. It is understood that, in practical applications, there may be more application scenarios, and the specific application scenario is not limited herein.

305. The RRM Server Sends an Available Spectrum Request to the Target Base Station.

The RRM server sends an available spectrum request to the target base station. The available spectrum request is used to instruct the target base station to return information about an available spectrum resource in the target base station. Specifically, the information about the available spectrum resource may include: an available physical resource block, central frequency position information, and available frequency bandwidth information.

306. The RRM Server Receives an Available Spectrum Response Sent by the Target Base Station.

The RRM server receives an available spectrum response sent by the target base station, where the available spectrum response carries the information about the available spectrum resource in the target base station.

307. The RRM Server Sends a Spectrum Sharing Indication Message to the Overloaded Base Station.

The RRM server sends a spectrum sharing indication message to the overloaded base station, where the sharing indication message carries the information about the available spectrum resource in the target base station, so that the overloaded base station uses the available spectrum resource of the target base station to transmit service data.

In practical applications, if the mode of the target base station is different from the mode of the overloaded base station, when performing spectrum sharing, the overloaded base station should select service data transmissible over the spectrum resource of the target base station for spectrum sharing.

Figure 4:
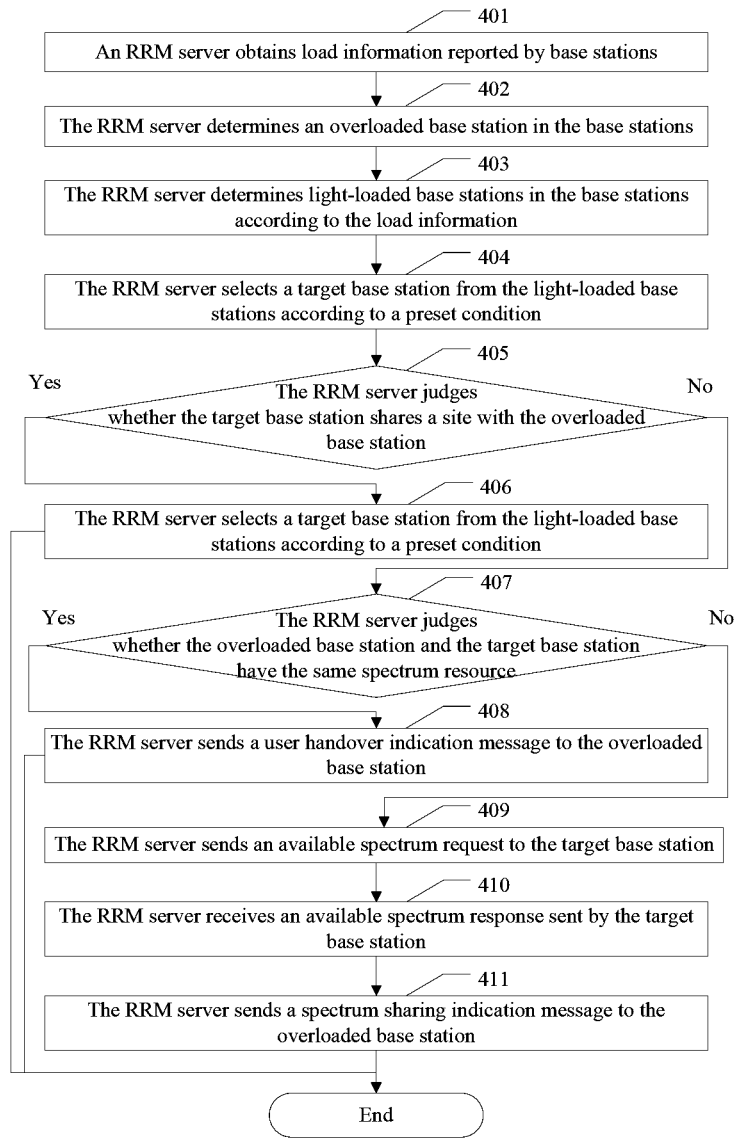
FIG. 4 is another schematic flowchart of a load balance method according to an embodiment of the present invention.

In practical applications, a possible scenario is that base stations in different modes share a site. The present invention provides a load balance method adaptable to this scenario. As shown in FIG. 4, a load balance method in another embodiment of the present invention includes the following:

401. An RRM Server Obtains Load Information Reported by Base Stations.

An RRM server obtains load information reported by base stations, where the base stations include at least one LTE base station, and may further include a UMTS base station and a GSM base station.

The load information is information that reflects radio resource occupation states of the base stations. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof load information of a Universal Mobile Telecommunications System (UMTS, Universal Mobile Telecommunications System) base station may be any one of maximum transmit power, maximum received power, and a maximum number of connected users, or a combination of at least two thereof load information of a GSM base station may be any one of a downlink transmit power class, a maximum number of connected users, spectrum occupancy rate, and idle resources, or a combination of at least two thereof.

402. The RRM Server Determines an Overloaded Base Station in the Base Stations.

The RRM server determines an overloaded base station in the base stations, where the overloaded base station is a base station in an overloaded state.

Optionally, the RRM server may detect an overloaded base station in the base stations according to the load information, or an overloaded base station reports itself proactively, which is not limited herein.

403. The RRM Server Determines Light-Loaded Base Stations in the Base Stations According to the Load Information.

After receiving a load balance request sent by a base station, the RRM server determines that the base station is an overloaded base station, and starts to perform a load balance operation for the overloaded base station.

The RRM server determines light-loaded base stations in the base stations according to the load information, where the light-loaded base stations are base stations that meet a light load condition.

Specifically, the RRM server may preset different light load conditions for base stations of different modes, and, when detecting any one base station meeting a light load condition, determine that the base station is a light-loaded base station. For example, for an LTE base station, an idle resource rate threshold preset by the RRM server is $TH_4$, and a preset threshold of network capacity corresponding to reserved resources is $TH_5$. It is assumed that an idle resource rate and the number of reserved resources that are reported by an LTE base station j are $LI_{j,4}$ and $LI_{j,5}$ respectively. If $LI_{j,4} > TH_4$, or $LI_{j,5} > TH_5$, it indicates that the cell j is a light-loaded base station.

404. The RRM Server Selects a Target Base Station from the Light-Loaded Base Stations According to a Preset Condition.

After determining the light-loaded base stations, the RRM server selects a target base station from the light-loaded base stations according to a preset condition.

Optionally, in practical applications, if there is only one light-loaded base station, the light-loaded base station is determined as the target base station; and if there are multiple light-loaded base stations, one of the multiple light-loaded base stations is selected as the target base station according to a preset parameter in the preset condition.

The preset parameter includes any one of a base station mode, a distance from the overloaded base station, and a base station load state, or a combination of at least two thereof.

Specifically, the selecting one of the multiple light-loaded base stations as the target base station according to a preset parameter in the preset condition may be: calculating a migration matching degree between each light-loaded base station and the overloaded base station according to the base station mode, the distance from the overloaded base station, the base station load state, and corresponding preset weights, where the migration matching degree is a degree suitable for the overloaded base station to perform load balance. For example, a weight corresponding to a light-loaded base station in the same mode as the overloaded base station is 8 and otherwise 0. It is assumed that the light-loaded base station is in the same mode as the overloaded base station. A weight corresponding to 1-kilometer distance from the overloaded base station is 5, where the distance is in inverse proportion to the weight value. If a distance between the light-loaded base station and the overloaded base station is 5 kilometers, a weight of the distance from the overloaded base station corresponding to the light-loaded base station is 5 divided by 5. It is assumed that a weight corresponding to one unit of idle resource of the light-loaded base station is 3, where the number of idle resources is in proportion to the weight. If the light-loaded base station has 2 units of idle resources, a weight of a load state corresponding to the light-loaded base station is 2 times 3. The calculated weights of various parameters are added up to obtain that a migration matching degree between the light-loaded base station and the overloaded base station is 15.

After the migration matching degree corresponding to each base station is obtained, a light-loaded base station with the highest migration matching degree is selected as the target base station.

405. The RRM Server Judges Whether the Target Base Station Shares a Site with the Overloaded Base Station.

The RRM server judges whether the target base station shares a site with the overloaded base station; if yes, step 406 is triggered; and if no, step 407 is triggered. The sharing a site with the overloaded base station refers to residing on a common site with the overloaded base station.

406. The RRM Server Sends an Intra-Site Balance Indication to the Overloaded Base Station.

The RRM server sends an intra-site balance indication to the overloaded base station, so that the overloaded base station searches for a user corresponding to a terminal that supports multiple modes (if the two base stations share a site, the two base stations are in different modes, and therefore, it is necessary to select a user corresponding to a multimode terminal), and uses an idle spectrum resource of the target base station to transmit the service data of the user.

In the embodiment of the present invention, if the overloaded base station and the target base station (in different modes) are deployed at one same place, a spectrum sharing manner is preferentially used to divert a load of the overloaded base station to the target base station, so as to optimize the resource allocation in a communications network.

407. The RRM Server Judges Whether the Overloaded Base Station and the Target Base Station have the Same Spectrum Resource.

The RRM server judges whether the overloaded base station and the target base station have the same spectrum resource; if yes, step 408 is triggered; and if no, step 409 is triggered.

In the embodiment of the present invention, the load balance method may also be selected according to the spectrum resources of the overloaded base station and the target base station. If the overloaded base station and the target base station have the same spectrum resource, spectrum sharing is not appropriate; and if the overloaded base station and the target base station have different spectrum resources, a spectrum sharing manner is preferentially used for load balance (because user handover requires more overhead).

408. The RRM Server Sends a User Handover Indication Message to the Overloaded Base Station.

The RRM server sends a user handover indication message to the overloaded base station, instructing the overloaded base station to hand over users to the target base station, where the user handover indication message carries identifier or address information of the target base station.

In practical applications, if the mode of the target base station is different from the mode of the overloaded base station, when performing user handover, the overloaded base station should select users (terminals) that support the mode of the target base station for user handover.

409. The RRM Server Sends an Available Spectrum Request to the Target Base Station.

The RRM server sends an available spectrum request to the target base station. The available spectrum request is used to instruct the target base station to return information about an available spectrum resource in the target base station. Specifically, the information about the available spectrum resource may include: an available physical resource block, central frequency position information, and available frequency bandwidth information.

410. The RRM Server Receives an Available Spectrum Response Sent by the Target Base Station.

The RRM server receives an available spectrum response sent by the target base station, where the available spectrum response carries the information about the available spectrum resource in the target base station.

411. The RRM Server Sends a Spectrum Sharing Indication Message to the Overloaded Base Station.

The RRM server sends a spectrum sharing indication message to the overloaded base station, where the sharing indication message carries the information about the available spectrum resource in the target base station, so that the overloaded base station uses the available spectrum resource of the target base station to transmit service data.

In practical applications, if the mode of the target base station is different from the mode of the overloaded base station, when performing spectrum sharing, the overloaded base station should select service data transmissible over the spectrum resource of the target base station for spectrum sharing.

Optionally, in practical applications, load balance may be implemented not only by means of user handover and spectrum sharing, but also through pilot signal regulation. Specifically, if a coverage area of a pilot signal of the overloaded base station overlaps that of the target base station, or, if a minimum distance between a coverage area of a pilot signal of the overloaded base station and a coverage area of a pilot signal of the target base station is less than a preset value (the preset value is generally a small value, such as 100 meters, which means that the overloaded base station is adjacent to the target base station), the RRM server may instruct the overloaded base station to reduce pilot signal transmit power, and instruct the target base station to increase pilot signal transmit power, causing an edge user originally borne on the overloaded base station to disconnect from the overloaded base station and search for a new base station for establishing a connection. Because the pilot signal of the target base station is amplified, the edge user will possibly be connected to the target base station.

Optionally, after the overloaded base station and the target base station complete the load balance operation in various manners, if the overloaded base station is still overloaded, and/or the target base station changes to be overloaded, the overloaded base station or the target base station is instructed to reduce rates of low priority users, so as to further reduce the load of the base station.

Figure 5:
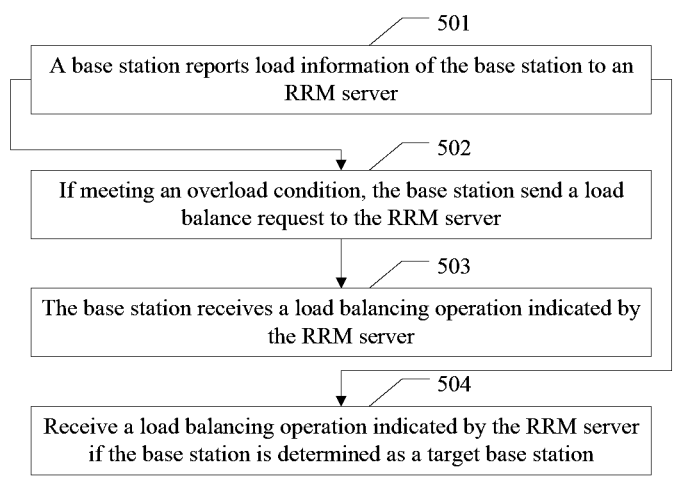
FIG. 5 is another schematic flowchart of a load balance method according to an embodiment of the present invention.

The foregoing has described the load balance method in the embodiments of the present invention from the perspective of the RRM server, and the following will describe the load balance method in the embodiments of the present invention from the perspective of a base station. As shown in FIG. 5, a load balance method in another embodiment of the present invention includes the following:

501. A Base Station Reports Load Information of the Base Station to an RRM Server.

A base station reports load information of the base station to an RRM server, so that the RRM server determines, according to the load information, a target base station to perform load balance, where the target base station is a base station to share a load of an overloaded base station.

The load information is information that reflects a radio resource occupation state of the base station. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof; load information of a Universal Mobile Telecommunications System (UMTS) base station may be any one of maximum transmit power, maximum received power, and a maximum number of connected users, or a combination of at least two thereof; load information of a GSM base station may be any one of a downlink transmit power class, a maximum number of connected users, spectrum occupancy rate, and idle resources, or a combination of at least two thereof.

Optionally, the base station may proactively report the load information periodically, or report the load information after receiving an instruction from the RRM server. The specific reporting manner may depend on actual conditions, and is not limited herein.

Optionally, the RRM server may determine an overloaded base station according to the load information reported by base stations.

502. If Meeting an Overload Condition, the Base Station Sends a Load Balance Request to the RRM Server.

Optionally, after the base station meets an overload condition, the base station may send a load balance request to the RRM server, so that the RRM server instructs the base station to perform load balance.

Optionally, the base station may use the load balance request to carry resource information of an edge user of the base station, so that the RRM server instructs, according to the resource information, the target base station to reserve a resource.

503. The Base Station Receives a Load Balance Operation Indicated by the RRM Server.

After the base station meets the overload condition, the base station receives a load balance operation indicated by the RRM server.

Optionally, depending on actual conditions, the base station may receive a user handover indication message sent by the RRM server, where the user handover indication message carries an identifier or address of the target base station, and hand over users to the target base station according to the user handover indication message.

Alternatively, the base station may receive a sharing indication message sent by the RRM server, where the sharing indication message carries information about an available spectrum resource in the target base station; and use the available spectrum resource of the target base station to transmit service data.

Alternatively, the base station receives an indication message of reducing pilot signal transmit power from the RRM server, and reduces the pilot signal transmit power according to the indication message.

Optionally, after the overloaded base station and the target base station complete the load balance operation in various manners, if a local overloaded base station is still overloaded, the overloaded base station may receive a rate reduction indication message from the RRM server and reduce rates of low priority users according to the rate reduction indication message.

504. If the Base Station is Determined as a Target Base Station, the Base Station Receives the Load Balance Operation Indicated by the RRM Server.

Optionally, depending on actual conditions, if the base station is determined as a target base station, the base station may receive an available spectrum request sent by the RRM server, and return an available spectrum response to the RRM server according to the available spectrum request, where the available spectrum response carries the information about the available spectrum resource in the base station.

Optionally, depending on actual conditions, an indication message of increasing pilot signal transmit power is received from the RRM server, and pilot signal transmit power is increased according to the indication message.

Optionally, depending on the actual conditions, after a local target base station and the overloaded base station complete the load balance operation, if the local overloaded base station changes to an overloaded state, the local target base station may receive a rate reduction indication message from the RRM server and reduce rates of low priority users according to the rate reduction indication message.

Figure 6:
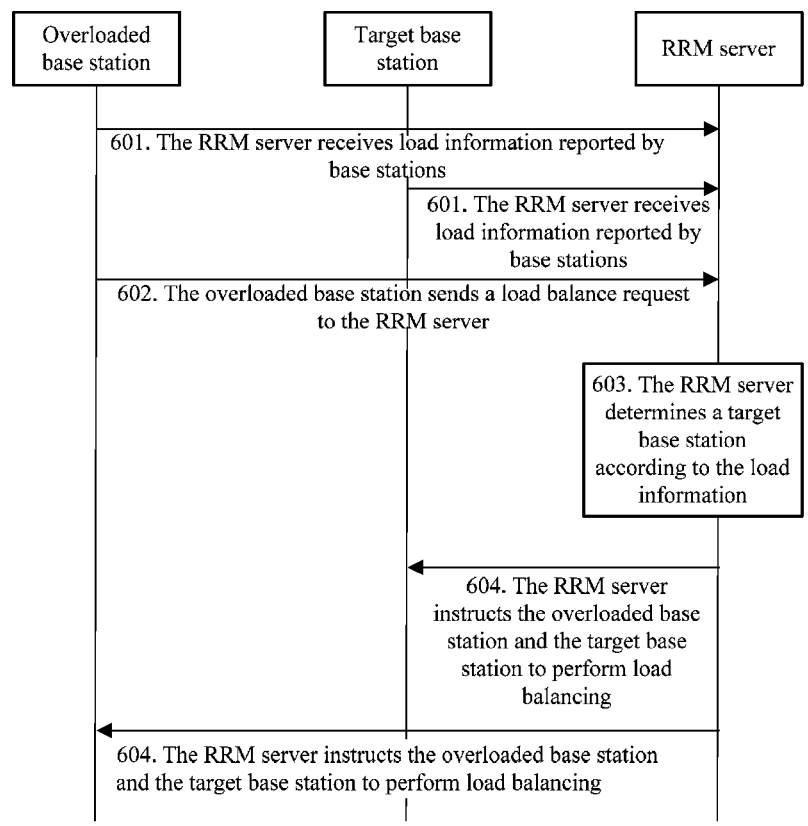
FIG. 6 is another schematic flowchart of a load balance method according to an embodiment of the present invention.

To facilitate understanding, the following describes the load balance method in the foregoing embodiment in more detail by using a specific application scenario. As shown in FIG. 6, a detailed process is as follows:

601. An RRM Server Receives Load Information Reported by Base Stations.

An RRM server receives load information reported by base stations, where the base stations include at least one LTE base station, and may further include a UMTS base station and a GSM base station.

The load information is information that reflects radio resource occupation states of the base stations. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof; load information of a Universal Mobile Telecommunications System (UMTS) base station may be any one of maximum transmit power, maximum received power, and a maximum number of connected users, or a combination of at least two thereof; load information of a GSM base station may be any one of a downlink transmit power class, a maximum number of connected users, spectrum occupancy rate, and idle resources, or a combination of at least two thereof.

Figure 7:
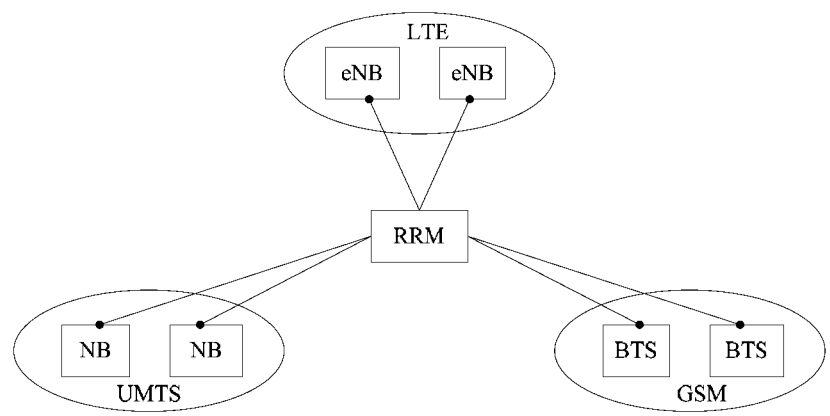
FIG. 7 is a schematic diagram of a network architecture of a load balance method according to an embodiment of the present invention.
Figure 8:
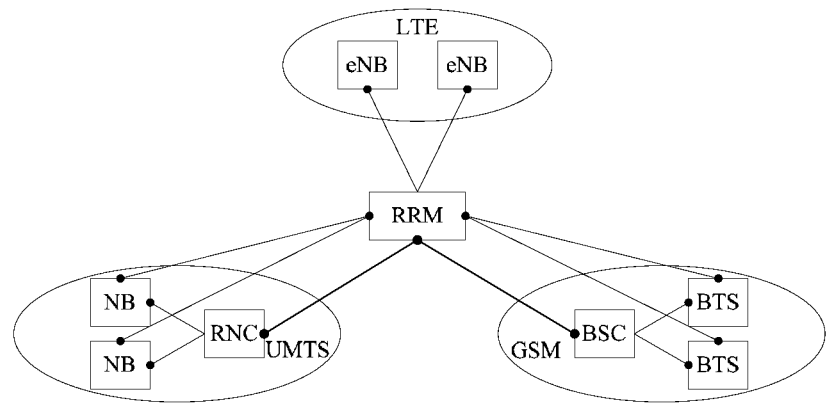
FIG. 8 is another schematic diagram of a network architecture of a load balance method according to an embodiment of the present invention.

In practical applications, when a network architecture is deployed, an RRM server may be deployed in a certain range to correspondingly optimize and allocate radio resources of multiple modes of radio systems in the range, where the multiple modes of radio systems include an LTE system. The RRM server may establish communication connections to base stations in the multiple modes of radio systems through an S.x interface, and for the structure of connections between the RRM server and the base stations, reference may be made to FIG. 7 or FIG. 8. FIG. 7 is an architecture of direct communications between an RRM server and base stations. FIG. 8 is an architecture where an RRM server sends control signaling to a base station through a radio network controller (RNC) or a base station controller (BSC), where a (NB, Node B) is a UMTS base station, and a Base Transceiver Station (BTS) is a GSM base station.

602. An Overloaded Base Station Sends a Load Balance Request to the RRM Server.

Optionally, after the base station meets an overload condition, the base station may send a load balance request to the RRM server, so that the RRM server instructs the base station to perform load balance.

Optionally, the load balance request may carry resource information of an edge user of the overloaded base station, and therefore, when the RRM server instructs the overloaded base station and a target base station to perform user handover subsequently, the RRM server may instruct, according to the resource information, the target base station to a reserve resource. Specifically, edge users may be determined by the overloaded base station which may perform sorting according to reference signal power received from users, and determine the last 5% users as edge users. Specifically, in an LTE system, the resource information may be physical resource block information; in a UMTS system, the resource information may be codeword information; and in a GSM system, the resource information may be a GSM carrier.

603. The RRM Server Determines a Target Base Station According to the Load Information.

The RRM server may first determine light-loaded base stations in the base stations according to the load information, and then select a target base station from the light-loaded base stations according to a preset condition.

Optionally, in practical applications, if there is only one light-loaded base station, the light-loaded base station is determined as the target base station; and if there are multiple light-loaded base stations, one of the multiple light-loaded base stations is selected as the target base station according to a preset parameter in the preset condition. The preset parameter includes any one of a base station mode, a distance from the overloaded base station, and a base station load state, or a combination of at least two thereof.

604. The RRM Server Instructs the Overloaded Base Station and the Target Base Station to Perform Load Balance.

Optionally, the RRM server may send a user handover indication message to the overloaded base station, instructing the overloaded base station to hand over users to the target base station, so as to complete a load balance operation. To ensure that the overloaded base station completes user handover successfully, the RRM server may send a resource reservation indication message to the target base station, so that the target base station performs a corresponding spectrum resource reservation operation and reserves a specific spectrum space to receive users handed over from the overloaded base station. Specifically, if a user handed over by the overloaded base station to the target base station is an edge user, the edge user of the overloaded base station may share the same spectrum resource with an edge user of the target base station, and the user handover may be unsuccessful. Therefore, the RRM server may obtain resource information (which may be extracted from the load balance request) of the edge user of the overloaded base station. When the resource reservation indication message is sent to the target base station, the resource reservation indication message carries the resource information, so that the target base station reserves a corresponding spectrum resource according to the resource information (if a spectrum resource used by an edge user of the overloaded base station conflicts with a spectrum resource used by an edge user of the target base station, after receiving the resource reservation indication message, the target base station may schedule spectrum resources for local edge users of the target base station to improve the success ratio of user handover).

In practical applications, if the mode of the target base station is different from the mode of the overloaded base station, when performing user handover, the overloaded base station should select users (terminals) that support the mode of the target base station for user handover.

Optionally, the RRM server may send an available spectrum request to the target base station, and receive an available spectrum response sent by the target base station; and, send a spectrum sharing indication message to the overloaded base station according to information about an available spectrum resource in the available spectrum response, so that the overloaded base station uses the available spectrum resource of the target base station to transmit service data, thereby completing the load balance operation.

In practical applications, if the mode of the target base station is different from the mode of the overloaded base station, when performing spectrum sharing, the overloaded base station should select service data transmissible over the spectrum resource of the target base station for spectrum sharing.

Figure 9:
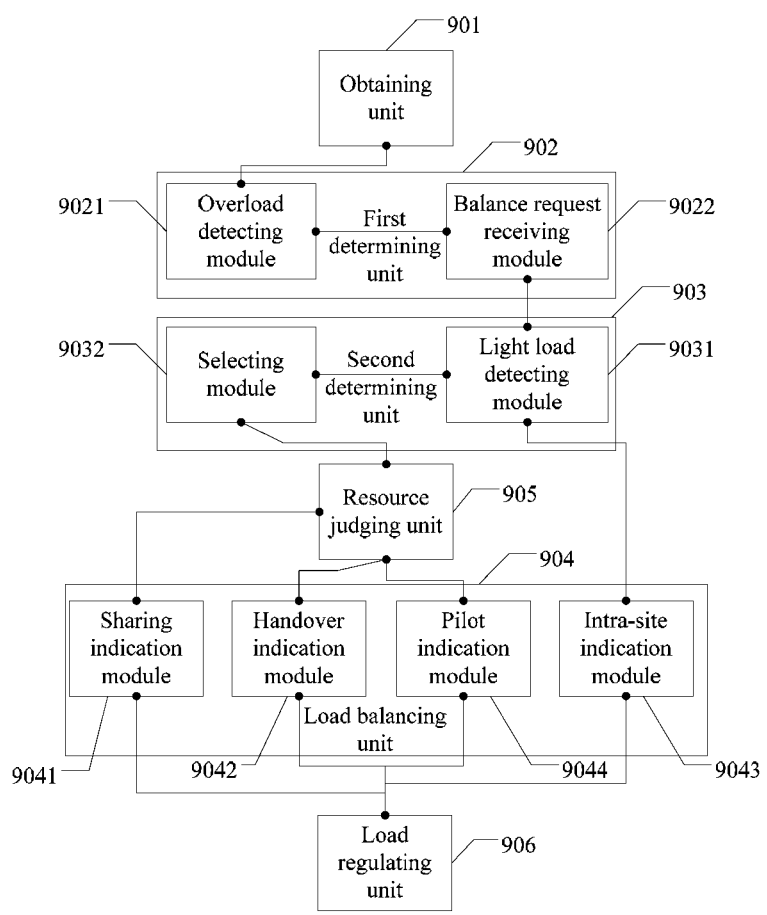
FIG. 9 is a schematic structural diagram of an RRM server according to an embodiment of the present invention.

The following describes an embodiment of an RRM server of the present invention that is used to execute the foregoing load balance method, and for the logical structure of the RRM server, refer to FIG. 9. The RRM server in the embodiment of the present invention includes the following:

an obtaining unit 901, configured to obtain load information reported by base stations, where the base stations include a Long Term Evolution LTE base station;

a first determining unit 902, configured to determine an overloaded base station in the base stations;

a second determining unit 903, configured to determine a target base station according to the load information, where the target base station is a base station to share a load of the overloaded base station; and a load balance unit 904, configured to instruct the overloaded base station and the target base station to perform load balance.

The first determining unit 902 in the embodiment of the present invention may include:

an overload detecting unit 9021, configured to detect load states of the base stations according to the load information; and, if the load information of any one of the base stations meets an overload condition, determine that the base station is an overloaded base station; or a balance request receiving module 9022, configured to receive a load balance request sent by any one of the base stations, and determine that the base station sending the load balance request is an overloaded base station.

The second determining unit 903 in the embodiment of the present invention may include:

a light load detecting module 9031, configured to determine light-loaded base stations in the base stations according to the load information;

a selecting module 9032, configured to select a target base station from the light-loaded base stations according to a preset condition, where the preset condition includes any one of a base station mode, a distance from the overloaded base station, a base station load state, or a combination of at least two thereof.

The load balance unit 904 in the embodiment of the present invention includes:

a handover indication module 9041, configured to send a user handover indication message to the overloaded base station, instructing the overloaded base station to hand over users to the target base station, where the user handover indication message carries identifier or address information of the target base station;

a sharing indication module 9042, configured to send an available spectrum request to the target base station; receive an available spectrum response sent by the target base station, where the available spectrum response carries information about an available spectrum resource in the target base station; and send a spectrum sharing indication message to the overloaded base station, where the sharing indication message carries the information about the available spectrum resource in the target base station, so that the overloaded base station uses the available spectrum resource of the target base station to transmit service data;

an intra-site indication module 9043, configured to send an intra-site balance indication to the overloaded base station, so that the overloaded base station searches for users corresponding to terminals that support multiple modes and uses an idle spectrum resource of the target base station to transmit service data of the users; and a pilot indication module 9044, configured to: if a coverage area of a pilot signal of the overloaded base station overlaps that of the target base station, or, if a minimum distance between a coverage area of a pilot signal of the overloaded base station and a coverage area of a pilot signal of the target base station is less than a preset value, instruct the overloaded base station to reduce pilot signal transmit power, and instruct the target base station to increase pilot signal transmit power.

The radio resource management server in the embodiment of the present invention may further include:

a resource judging unit 905, configured to judge whether the overloaded base station and the target base station have the same spectrum resource; if yes, trigger the handover indication module 9041; and if no, trigger the sharing indication module 9042;

a load regulating unit 906, configured to: after the overloaded base station and the target base station perform load balance, if the overloaded base station is still overloaded and/or the target base station changes to be overloaded, instruct the overloaded base station or the target base station to reduce rates of low priority users.

Detailed operation processes of the units in the radio resource management server in the embodiment of the present invention are as follows:

The obtaining unit 901 obtains load information reported by base stations, where the base stations include at least one LTE base station. Specifically, the base stations may all be LTE base stations, or may include base stations of other modes, which is not limited herein.

The load information is information that reflects radio resource occupation states of the base stations. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof; load information of a Universal Mobile Telecommunications System (UMTS) base station may be any one of maximum transmit power, maximum received power, and a maximum number of connected users, or a combination of at least two thereof; load information of a GSM base station may be any one of a downlink transmit power class, a maximum number of connected users, spectrum occupancy rate, and idle resources, or a combination of at least two thereof. Optionally, the base stations may proactively report the load information periodically, or the RRM server may instruct, through an indication message, the base stations to report the load information. The specific reporting manner may depend on actual conditions, and is not limited herein.

The first determining unit 902 determines a target base station according to the load information, where the target base station is a base station to share a load of the overloaded base station. The target base station needs to share the load of the overloaded base station, and therefore, the target base station is a base station with idle spectrum resources that are enough to share the traffic overload of the overloaded base station. Specifically, the overload detecting unit 9021 detects load states of the base stations according to the load information; and, if the load information of any one of the base stations meets an overload condition, determines that the base station is an overloaded base station; or the balance request receiving module 9022 receives a load balance request sent by any one of the base stations, and determines that the base station sending the load balance request is an overloaded base station.

After the overloaded base station is determined, the second determining unit 903 determines a target base station according to the load information, where the target base station is a base station to share a load of the overloaded base station. Specifically, the light load detecting module 9031 may determine light-loaded base stations in the base stations according to the load information. Then the selecting module 9032 selects a target base station from the light-loaded base stations according to a preset condition, where the preset condition includes any one of a base station mode, a distance from the overloaded base station, and a base station load state, or a combination of at least two thereof.

After the overloaded base station and the corresponding target base station are determined, the load balance unit 904 instructs the overloaded base station and the target base station to perform a load balance operation. Specifically, the handover indication module 9041 may send a user handover indication message to the overloaded base station, instructing the overloaded base station to hand over users to the target base station, where the user handover indication message carries identifier or address information of the target base station. Alternatively, the sharing indication module 9042 sends an available spectrum request to the target base station, receives an available spectrum response sent by the target base station, where the available spectrum response carries information about an available spectrum resource in the target base station, and sends a spectrum sharing indication message to the overloaded base station, where the sharing indication message carries the information about the available spectrum resource in the target base station, so that the overloaded base station uses the available spectrum resource of the target base station to transmit service data. Alternatively, if the overloaded base station and the target base station share a site, the intra-site indication module 9043 sends an intra-site balance indication to the overloaded base station, so that the overloaded base station searches for users corresponding to terminals that support multiple modes and uses an idle spectrum resource of the target base station to transmit service data of the users.

Optionally, before the load balance unit works, the resource judging unit 905 may judge whether the overloaded base station and the target base station have the same spectrum resource; if yes, trigger the handover indication module 9041; and if no, trigger the sharing indication module 9042.

Optionally, in practical applications, load balance may be implemented not only by means of user handover and spectrum sharing, but also through pilot signal regulation performed by the pilot indication module 9044. Specifically, if a coverage area of a pilot signal of the overloaded base station overlaps that of the target base station, or, if a minimum distance between a coverage area of a pilot signal of the overloaded base station and a coverage area of a pilot signal of the target base station is less than a preset value (the preset value is generally a small value, such as 100 meters, which means that the overloaded base station is adjacent to the target base station), the RRM server may instruct the overloaded base station to reduce pilot signal transmit power, and instruct the target base station to increase pilot signal transmit power, causing an edge user originally borne on the overloaded base station to disconnect from the overloaded base station and search for a new base station for establishing a connection. Because the pilot signal of the target base station is amplified, the edge user will possibly be connected to the target base station.

Optionally, after the overloaded base station and the target base station complete the load balance operation in various manners, if the overloaded base station is still overloaded, and/or the target base station changes to be overloaded, the load regulating unit 906 instructs the overloaded base station or the target base station to reduce rates of low priority users, so as to further reduce the load of the base station.

Figure 10:
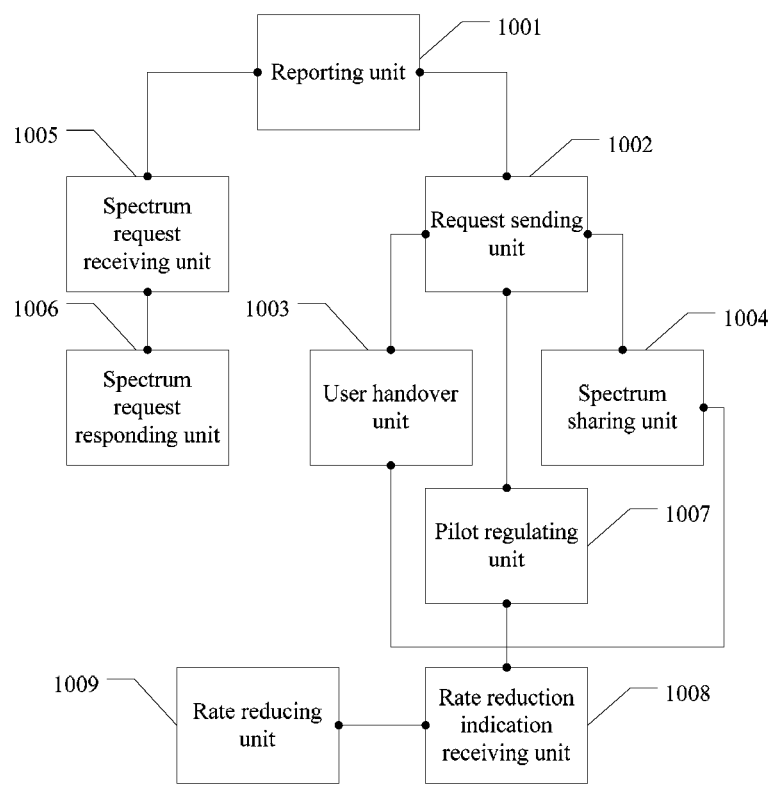
FIG. 10 is a schematic structural diagram of a base station according to an embodiment of the present invention.

The following describes an embodiment of a base station of the present invention that is used to execute the foregoing load balance method, and for the logical structure of the base station, refer to FIG. 10. The base station in the embodiment of the present invention includes the following:

a reporting unit 1001, configured to report load information of the base station to an RRM server, so that the RRM server determines, according to the load information, a target base station to perform load balance, where the target base station is a base station to share a load of an overloaded base station.

The base station in the embodiment of the present invention may further include:

a request sending unit 1002, configured to: if the base station meets an overload condition, send a load balance request to the RRM server, so that the RRM server instructs the base station to perform load balance;

a user handover unit 1003, configured to receive a user handover indication message sent by the RRM server, where the user handover indication message carries an identifier or address of the target base station; and hand over users to the target base station according to the user handover indication message;

a spectrum sharing unit 1004, configured to receive a sharing indication message sent by the RRM server, where the sharing indication message carries information about an available spectrum resource in the target base station; and use the available spectrum resource of the target base station to transmit service data;

a spectrum request receiving unit 1005, configured to receive an available spectrum request sent by the RRM server;

a spectrum request responding unit 1006, configured to return an available spectrum response to the RRM server according to the available spectrum request, where the available spectrum response carries information about an available spectrum resource in the base station;

a pilot regulating unit 1007, configured to receive an indication message of reducing or increasing pilot signal transmit power from the RRM server, and reduce or increase pilot signal transmit power according to the indication message;

a rate reduction indication receiving unit 1008, configured to receive a rate reduction indication message sent by the RRM server; and a rate reducing unit 1009, configured to reduce rates of low priority users according to the rate reduction indication message.

Detailed operation processes of the units in the base station in the embodiment of the present invention are as follows:

The reporting unit 1001 reports load information of the base station to an RRM server, so that the RRM server determines, according to the load information, a target base station to perform load balance, where the target base station is a base station to share a load of an overloaded base station.

The load information is information that reflects a radio resource occupation state of the base station. Optionally, in base stations of different modes, the load information may include different parameters. For example, load information of an LTE base station may be any one of spectrum occupancy rate, the number of users in a cell, service-based network capacity, an idle resource rate, and capacity corresponding to reserved resources, or a combination of at least two thereof load information of a UMTS base station may be any one of maximum transmit power, maximum received power, and a maximum number of connected users, or a combination of at least two thereof load information of a GSM base station may be any one of a downlink transmit power class, a maximum number of connected users, spectrum occupancy rate, and idle resources, or a combination of at least two thereof. Optionally, the base station may proactively report the load information periodically, or report the load information after receiving an instruction from the RRM server. The specific reporting manner may depend on actual conditions, and is not limited herein.

Optionally, after the base station meets an overload condition, the request sending unit 1002 may send a load balance request to the RRM server, so that the RRM server instructs the base station to perform load balance.

Optionally, after the base station meets an overload condition, the user handover unit 1003 receives a user handover indication message sent by the RRM server, where the user handover indication message carries an identifier or address of the target base station; and hands over users to the target base station according to the user handover indication message; or the spectrum sharing unit 1004 receives a sharing indication message sent by the RRM server, where the sharing indication message carries information about an available spectrum resource in the target base station; and uses the available spectrum resource of the target base station to transmit service data; or the pilot regulating unit 1007 receives an indication message of reducing or increasing pilot signal transmit power from the RRM server, and reduces or increases pilot signal transmit power according to the indication message.

Optionally, if the base station is determined as a target base station, the spectrum request receiving unit 1005 may receive an available spectrum request sent by the RRM server, and then the spectrum request responding unit 1006 returns an available spectrum response to the RRM server according to the available spectrum request, where the available spectrum response carries information about an available spectrum resource in the base station.

In the several embodiments provided in the present application, it should be understood that the disclosed apparatuses and methods may be implemented through other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, and may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented in a form of hardware, or may be implemented in a form of a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, an optical disk, or the like.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A load balance method carried out by a single radio resource management (RRM) server based upon load information provided by a group of base stations having overlapping coverage, wherein the group of base stations includes at least a first base station, a second base station and a third base station the method comprising:
    obtaining, by the single RRM server, a load information individually reported by each one of the group of base stations;
    determining, by the single RRM server, an overloaded condition of the first base station in the group of base stations;
    determining, by the single RRM server according to the load information a target base station from remaining ones of the group of base stations, wherein the target base station is able to relieve the overloaded condition of the first base station; and
    instructing, by the single RRM server, the first base station in the overloaded condition and the target base station to perform a load balance operation to relieve the overloaded condition in the first base station;
    wherein the determining the target base station comprises:
        determining a currently light-loaded condition of both the second base station and the third base station according to the load information; and
        selecting the target base station from the second base station and the third base station having the currently light-loaded condition according to a preset condition, wherein the preset condition comprises at least one of the group consisting of: a base station mode, a distance from the overloaded base station, and a base station load state.

2. The method according to claim 1, wherein the determining the overloaded condition of the first base station comprises one of the group consisting of:
    (a) detecting load state of the first base station according to the load information reported by the first base station; and, determining the load state of the first base station meets an overload condition; and,
    (b) receiving a load balance request sent by the first base station.

3. The method according to claim 1, wherein the selecting the target base station from the second base station and the third base station according to the preset condition comprises:
    applying a series of judgment conditions for selecting the target base station in turn, and
    terminating the applying the series of judgment conditions when a single base station is selected by a currently applied one of the series of judgment conditions;
    wherein the series of judgment conditions comprises, in order:
        first selecting all base stations in a same mode as the first base station;
        second selecting all base stations closest to the first base station; and
        third selecting a base station with a lightest load.

4. The method according to claim 1, wherein the selecting the target base station from the second base station and the third base station according to the preset condition comprises:
    calculating a migration matching degree value for each of the first and second base stations and the first base station in the overloaded condition, each of the calculated migration matching degree values being based on a combination of: a base station mode, a distance from the first base station, a base station load state, and corresponding preset weights; and
    selecting the target base station base station, from the migration matching degree values for the second base station and the third base station, with the highest migration matching degree value determining the target base station.

5. The method according to claim 1, wherein:
    the load information, for one of the group of base stations currently operating in a Long Term Evolution (LTE) mode, comprises at least one of spectrum occupancy rate, the number of users in a cell, service-based network capacity, an idle resource rate, and capacity corresponding to reserved resources;
    the load information, for one of the group of base stations currently operating in a Universal Mobile Telecommunications System (UMTS) mode, comprises at least one of maximum transmit power, maximum received power, and a maximum number of users connected; and
    the load information, for one of the group of base stations currently operating in a Global System for Mobile communications (GSM) mode, comprises at least one of a downlink transmit power class, a maximum number of users connected, spectrum occupancy rate, and idle resources.

6. A radio resource management (RRM) server, comprising a processor and a non-transitory processor-readable medium having processor-executable instructions stored thereon, the processor-executable instructions, when executed on the processor, enabling the RRM server to carry out a load balance method based upon load information provided by a group of base stations having overlapping coverage, wherein the group of base stations includes at least a first base station, a second base station and a third base station, the load balancing method including:
 obtaining a load information individually reported by each one of the group of base stations;
 determining an overloaded condition of the first base station in the group of base stations;
 determining, according to the load information, a target base station from remaining ones of the group of base stations, wherein the target base station is able to relieve the overloaded condition in the first base station; and
 instructing the first base station in the overloaded condition and the target base station to perform a load balance operation to relieve the overloaded condition in the first base station;
 wherein the determining the target base station comprises:
  determining a currently light-loaded condition of both the second base station and the third base station according to the load information; and
  selecting the target base station from the second base station and the third base station having the currently light-loaded condition according to a preset condition, wherein the preset condition comprises at least one of the group consisting of: a base station mode, a distance from the overloaded base station, and a base station load state.

7. The radio resource management server according to claim 6, wherein the determining overloaded condition of the first base station comprises one of the group consisting of:
 (a) detecting a load state of the first base station according to the load information reported by the first base station; and, determining the load state of the first base station meets an overload condition; and
 (b) receiving a load balance request sent by the first base station.

8. The radio resource management server according to claim 6, wherein instructing the first base station in the overloaded condition and the target base station to perform a load balance operation to relieve the overloaded condition in the first base station comprises one of the group consisting of:
 (a) sending a user handover indication message to the first base station in the overloaded condition the user handover indication message instructing the first base station to hand over users to the target base station, wherein the user handover indication message carries an identifier or an address information of the target base station;
 (b) sending an available spectrum request to the target base station; receiving an available spectrum response sent by the target base station, wherein the available spectrum response carries information about an available spectrum resource in the target base station; sending a spectrum sharing indication message to the first base station, wherein the sharing indication message carries the information about the available spectrum resource in the target base station, to enable the first base station to use the available spectrum resource of the target base station to transmit service data; and
 (c) instructing the first base station to reduce pilot signal transmit power, and instructing the target base station to increase pilot signal transmit power.

9. The radio resource management server according to claim 6, wherein the method carried out by the radio resource management server further comprises:
 instructing at least one of the first base station and the target base station to reduce rates of low priority users after the first base station and the target base station perform the load balance operation if at least one of the following situations occurs from the group consisting of:
 (a) the first base station is still overloaded, and
 (b) the target base station becomes overloaded.

10. The radio resource management server according to claim 6, wherein the method carried out by the radio resource management server further comprises:
 judging whether the first base station and the target base station have a same spectrum resource; and
 conditionally relieving the load of the first base station by:
 (a) sending a user handover indication message to the first base station in the overloaded condition, the user handover indication message instructing the first base station to hand over users to the target base station, wherein the user handover indication message carries an identifier or an address information of the target base station, if the first base station and the target base station have the same spectrum resource; and otherwise
 (b) sending an available spectrum request to the target base station; receiving an available spectrum response sent by the target base station, wherein the available spectrum response carries information about an available spectrum resource in the target base station; sending a spectrum sharing indication message to the first base station, wherein the sharing indication message carries the information about the available spectrum resource in the target base station, to enable the first base station to use the available spectrum resource of the target base station to transmit service data.

11. The radio resource management server according to claim 6, wherein instructing the first base station in the overloaded condition and the target base station to perform a load balance operation to relieve the overloaded condition in the first base station further comprises:
 conditionally sending an intra-site balance indication to the first base station in the overloaded condition, wherein if the first base station and the target base station share a site, sending an intra-site balance indication to the overloaded base station, to enable the first base station to search for users corresponding to terminals that support multiple modes, and to use an idle spectrum resource of the target base station to transmit service data of the users.

12. The RRM server of claim 6, wherein the selecting the target base station from the second base station and the third base station according to the preset condition comprises:
 applying a series of judgment conditions for selecting the target base station in turn, and
 terminating the applying the series of judgment conditions when a single base station is selected by a currently applied one of the series of judgment conditions,
 wherein the series of judgment conditions comprises, in order:

first selecting all base stations in a same mode as the first base station;
second selecting all base stations closest to the first base station; and
third selecting a base station with a lightest load.

13. The RRM server of claim 6, wherein the selecting the target base station from the second base station and the third base station according to the preset condition comprises:
calculating a migration matching degree value for each of the first and second base stations and the first base station in the overloaded condition, each of the calculated migration matching degree values being based on a combination of: a base station mode, a distance from the first base station, a base station load state, and corresponding preset weights; and
selecting the target base station base station, from the migration matching degree values for the second base station and the third base station, with the highest migration matching degree value determining the target base station.

14. The RRM server of claim 6, wherein:
the load information, for one of the group of base stations currently operating in a Long Term Evolution (LTE) mode, comprises at least one of spectrum occupancy rate, the number of users in a cell, service-based network capacity, an idle resource rate, and capacity corresponding to reserved resources;
the load information, for one of the group of base stations currently operating in a Universal Mobile Telecommunications System (UMTS) mode, comprises at least one of maximum transmit power, maximum received power, and a maximum number of users connected; and
the load information, for one of the group of base stations currently operating in a Global System for Mobile communications (GSM) mode, comprises at least one of a downlink transmit power class, a maximum number of users connected, spectrum occupancy rate, and idle resources.

* * * * *

UNITED STATES PATENT AND TRADEMARK OFFICE
CERTIFICATE OF CORRECTION

PATENT NO. : 9,843,963 B2
APPLICATION NO. : 14/336684
DATED : December 12, 2017
INVENTOR(S) : Xiao et al.

It is certified that error appears in the above-identified patent and that said Letters Patent is hereby corrected as shown below:

Column 22, Line 14 in Claim 2 "detecting load state" should read -- detecting a load state --.

Signed and Sealed this
First Day of May, 2018

Andrei Iancu
*Director of the United States Patent and Trademark Office*